(12) United States Patent
Tirloni et al.

(10) Patent No.: US 6,633,713 B2
(45) Date of Patent: Oct. 14, 2003

(54) OPTICAL SYSTEM AND METHOD HAVING LOW LOSS AND NON-LINEAR EFFECTS

(75) Inventors: Bartolomeo Italo Tirloni, Bergamo (IT); Giacomo Stefano Roba, Monza (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/880,766

(22) Filed: Jun. 15, 2001

(65) Prior Publication Data

US 2002/0041747 A1 Apr. 11, 2002

Related U.S. Application Data

(63) Continuation of application No. PCT/EP99/09962, filed on Dec. 15, 1999.
(60) Provisional application No. 60/120,759, filed on Feb. 19, 1999.

(30) Foreign Application Priority Data

Dec. 18, 1998 (EP) ............................................. 98124065

(51) Int. Cl.$^7$ ............................ G02B 6/02; G02B 26/08
(52) U.S. Cl. ....................... 385/123; 385/122; 385/124; 385/141; 385/126; 385/127; 359/115; 359/124; 359/161
(58) Field of Search ................................ 385/122, 123, 385/124, 141, 126, 127

(56) References Cited

U.S. PATENT DOCUMENTS 4,406,518 A    9/1983 Matsumura et al. ...... 350/96.31

(List continued on next page.)

FOREIGN PATENT DOCUMENTS

EP    0 464 812 A1    1/1992

(List continued on next page.)

OTHER PUBLICATIONS

G. Grasso., et al., "Microbending Effects in Single Mode Optical Cables", International Wire and Cable Symposium Proceedings, pp. 722–731, 1988.

(List continued on next page.)

Primary Examiner—Brian Healy
(74) Attorney, Agent, or Firm—Finnegan, Henderson, Farabow, Garrett & Dunner, L.L.P.

(57) ABSTRACT

An apparatus and method for transmitting an optical signal. The invention is directed to a transmission line having first (16) and second (18) spans of single mode fiber. The fiber of the first span has a negative dispersion with an absolute value of between about 2.5 ps/nm/km and 10 ps/nm/km at the operating wavelength. The second span (18) is connected to the first span (16) and has a positive dispersion at the operating wavelength. The positive dispersion of the second span compensates for the negative dispersion of the first span such that the cumulative dispersion across the first and second spans is approximately zero. The increased dispersion of the first span coincides with characteristics to lower non-linear effects, permits a longer length of the second span, and helps lower attenuation in the transmission line.

62 Claims, 10 Drawing Sheets

U.S. PATENT DOCUMENTS

| | | | |
|---|---|---|---|
| 4,969,710 A | 11/1990 | Tick et al. | 350/96.3 |
| 5,343,322 A | 8/1994 | Pirio et al. | 359/173 |
| 5,559,920 A * | 9/1996 | Chraplyvy et al. | 359/115 |
| 5,587,830 A | 12/1996 | Chraplvvy et al. | 359/341 |
| 5,611,016 A | 3/1997 | Fangmann et al. | 385/100 |
| 5,675,429 A | 10/1997 | Henmi et al. | 359/179 |
| 5,684,909 A | 11/1997 | Liu | 385/127 |
| 5,719,696 A | 2/1998 | Chraplyvy et al. | 359/341 |
| 5,788,128 A | 7/1998 | Wildeman | 385/123 |
| 5,905,838 A | 5/1999 | Judy et al. | 385/123 |
| 6,275,314 B1 * | 8/2001 | Ishikawa et al. | 359/124 |
| 6,343,176 B1 | 1/2002 | Li et al. | 385/127 |

FOREIGN PATENT DOCUMENTS

| | | | |
|---|---|---|---|
| EP | 0 554 714 A1 | 8/1993 | |
| EP | 0 790 510 A2 | 8/1997 | |
| EP | 0 801 452 A2 | 10/1997 | |
| EP | 0 883 002 A1 | 12/1998 | |
| EP | 0 984 305 A1 | 3/2000 | |
| GB | 2 268 018 A | 12/1993 | |
| GB | 2 299 473 | 10/1996 | |
| WO | WO99/30194 | 6/1999 | |
| WO | WO00/17681 | 3/2000 | |
| WO | WO00/17683 | 3/2000 | |
| WO | WO 00/20905 | 4/2000 | 385/123 X |
| WO | WO 00/20906 | 4/2000 | 385/123 X |
| WO | WO00/31573 | 6/2000 | |

OTHER PUBLICATIONS

G. Grasso, et al., "Microbending Losses of Cabled Single Mode Fibres", ECOC, pp. 526–532, 1988.

D. Peckham, et al., "Reduced Dispersio n Slope, Non–Zero Dispersion Fiber", ECOC, pp. 139–140, Sep. 1998.

Chong–Cheng Fan, et al., "A New Dispersion Compensation Method for High–Speed Wavelength Division Multiplexed Optical Transmission Systems", Acta Electronica Sinica, vol. 23, No. 12, pp. 18–22, Dec. 1995 (with English–language translation).

Jeunhomme, L., "Basic Theory", Single Mode Fiber Optics, Marcel Dekker, Inc., Section 1.3.2, pp. 32–39 (1990).

* cited by examiner

Fig. 2 - Prior Art

OPTICAL SYSTEM AND METHOD HAVING LOW LOSS AND NON-LINEAR EFFECTS

The application is a continuation of International Application No. PCT/EP99/09962, filed Dec. 15, 1999, which is incorporated by reference herein, and claims the priority of EP98124065.8, filed Dec. 18,1998, and the benefit of U.S. Provisional application No. 60/120,759, filed Feb. 19, 1999, which is incorporated by reference herein.

BACKGROUND OF THE INVENTION

The present invention relates generally to an apparatus and method for transmitting an optical signal. More particularly, the present invention relates to an apparatus and method for reducing the total attenuation and non-linear effects of a long distance optical communication system.

In today's worldwide communication systems, it is often necessary to extend a transmission line over a long distance, which may include a body of water, to provide a communication link between a transmitter and a receiver. The current trend in communication systems is to use optical fibers to make these transmission lines. Optical fibers are preferred because the fibers can transmit a large number of digital signals at a high data transmission rate.

To further improve the signal carrying capacity of the transmission line, optical fibers can be used with Wavelength Division Multiplexing (WDM) technology. This technology allows multiple optical signals to be sent through the same fiber at closely spaced wavelength channels. This greatly enhances the information carrying capacity of the overall transmission system.

Several problems are encountered when optical fibers are used to transmit signals over a significant distance. For example, the power of the optical signal decreases as the signal travels through each fiber. This power loss, also called attenuation, can be compensated for by including amplifiers along the transmission line to boost the power of the signal. The placement and number of amplifiers along the transmission line is partly determined by the attenuation of the optical fiber. Obviously, a signal sent through a fiber with a low attenuation needs fewer amplifiers than a signal sent over a fiber with a high attenuation.

Chromatic dispersion is another problem encountered when transmitting signals over optical fibers. Chromatic dispersion, hereafter referred to as "dispersion," arises from the optical fiber transmitting the different spectral components of an optical pulse at different speeds, which can lead to the spreading or broadening of an optical pulse as it travels down the transmission line. Each optical fiber has a dispersion value that varies as a function of the wavelength of the optical signal and arises from the material composition of the glass optical fiber and the waveguide characteristics. The dispersion within the optical fiber at a given wavelength can be positive, negative, or zero, depending on the transmission characteristics of the fiber. Despite the type of dispersion (positive or negative), excessive amounts can lead to detection errors at the receiver of the optical signal.

Transmitting signals at the zero-dispersion wavelength of a fiber will practically eliminate the dispersion problem, but can exacerbate other transmission problems, particularly non-linear effects when used with WDM systems. A particularly relevant non-linear effect in WDM systems is the phenomenon of Four Wave Mixing (FWM). FWM occurs when at least two signals verifying phase matching conditions are sent through the same fiber (as in WDM systems) and interact to generate new wavelengths. In the case of WDM systems having a large number (more than two) of equally spaced channels, these new wavelengths will eventually overlap with the signal wavelengths, thus degrading the Signal-to-Noise Ratio. It is known that WDM systems that have an operating wavelength different from the zero-dispersion wavelength of the transmission fiber (and therefore have a non-zero dispersion value at the operating wavelength) minimize FWM degradation. More precisely, FWM efficiency η, defined as the ratio of the FWM power to the per channel output power (assuming equal input power for all the channels) is approximately proportional to:

$$\eta \propto \left[\frac{n_2 \alpha}{A_{eff} D (\Delta \lambda)^2}\right]^2$$

where $\alpha$ is the fiber attenuation; $n_2$ is the nonlinear refractive index; $A_{eff}$ is the fiber effective area; D is the dispersion; and $\Delta\lambda$ is the channel spacing. The above approximation is valid under the condition $\alpha \ll \Delta\beta$, where $\Delta\beta = (2\pi c/\lambda^2) \cdot D \cdot \Delta\lambda^2$, c is the speed of light and $\lambda$ the transmission wavelength. See D. W. Peckham, A. F. Judy and R. B. Kummer, ECOC '98, paper TuA06, pp. 139–140. As can be seen, for a given set of values for $\Delta\lambda$, $n_2$, and $\alpha$, to decrease FWM efficiency one can increase the absolute value of dispersion and/or increase the value of fiber effective area $A_{eff}$. On the other hand, decreasing channel spacing dramatically increases FWM efficiency.

Other non-linear effects include Self Phase Modulation, Cross Phase Modulation, Stimulated Brillouin Scattering (SBS), and Raman Scattering (SRS). It is well known that a fiber with a larger effective area at the operating wavelength is less susceptible to all non-linear effects.

To solve the dispersion and non-linear effects associated with sending signals through long optical fibers, conventional systems use transmission lines that connect spans of optical fiber that have alternating dispersion values. For example, a span of negative dispersion fiber can be followed with a span of positive dispersion fiber to even out the overall dispersion over the transmission line. This approach ensures that the dispersion is non-zero at local values throughout the transmission line to avoid non-linear effects and that the total dispersion over the cumulative transmission line is compensated to nearly zero at the receiver.

Various publications discuss different approaches to solve these problems. For example, U.S. Pat. No. 4,969,710 to Tick et al. discusses an optical fiber transmission path wherein total dispersion of the system is compensated by the use of fibers composed of glasses with total dispersion of opposite signs at the operating wavelength for the system.

U.S. Pat. No. 5,343,322 to Pirio et al. discusses a system for long distance transmission of a digital signal. The system uses optical fiber having a low negative dispersion to connect receiver stations that include dispersion compensation devices having positive dispersions to compensate for the negative dispersion.

U.S. Pat. No. 5,559,920 to Chraplyvy et al. discusses an optical communication system having an initial span of a strong negative dispersion followed by positive dispersion spans. The system overcompensates for the negative dispersion in that the final dispersion value is not zero.

Other publications, such as U.S. Pat. No. 5,587,830 to Chraplyvy et al., U.S. Pat. No. 5,719,696 to Chraplyvy et al., U.S. Pat. No. 5,675,429 to Henmi et al., and U.S. Pat. No. 5,778,128 to Wildeman also discuss transmission lines for long range systems. These publications disclose transmission lines that use varying combinations of fiber that have either a negative dispersion or a positive dispersion at the operating wavelength. The negative dispersion fiber and the positive dispersion fiber are arranged so that the total dispersion of the system is compensated to approximately zero.

Similarly, U.K Patent No. 2 268 018 also discusses an optical transmission system that combines optical fiber having a negative dispersion with fiber having positive dispersion to compensate the dispersion to zero for the total length of the transmission.

European Patent Application No. 0 790 510 A2 discusses a symmetric, dispersion-managed fiber optic cable. The cable of this disclosure includes a conventional single mode fiber having a positive dispersion at the operating wavelength connected to a second optical fiber that has a negative dispersion at the operating wavelength.

Applicants have noted that these prior arrangements use combinations of optical fiber that result in undesirably high levels of attenuation. Moreover, Applicants have noted that the optical fiber used in conventional systems does not adequately provide performance for reducing non-linear effects while minimizing attenuation.

SUMMARY OF THE INVENTION

In general, the present invention involves an optical transmission system and method for transmitting optical signals over a significant distance. In particular, the invention involves an apparatus and method for reducing the attenuation and non-linear effects of the optical transmission system.

In accordance with the purpose of the invention as embodied and broadly described herein, the invention is directed to an optical transmission line that includes first and second spans of single-mode fiber. The fiber of the first span has a negative dispersion with an absolute value of between about 2.5 ps/nm/km and 10 ps/nm/km at the operating wavelength. The second span is connected to the first span and has a positive dispersion at the operating wavelength. The positive dispersion of the second span compensates for the negative dispersion of the first span such that the cumulative dispersion across the first and second spans is approximately zero.

Preferably the absolute value of the negative dispersion of the first span at the operating wavelength is between about 3 ps/nm/km and 8 ps/nm/km, more preferably between about 4 ps/nm/km and 7 ps/nm/km.

Preferably the fiber of the first span has a zero dispersion wavelength of between about 1600 nm and 1670 nm and the operating wavelength is approximately 1560 nm.

In an embodiment the positive dispersion of the second span is between about 10 ps/nm/km and 20 ps/nm/km at the operating wavelength. Preferably a atio of the length of the first span to the length of the second span is less than about 7:1, more preferably less than about 5:1.

In another embodiment the fiber of the second span is a half-dispersion-shifted fiber having a zero dispersion wavelength between about 1350 nm and 1450 nm. In this embodiment the positive dispersion of the second span is preferably between about 7.5 ps/nm/km and 15.5 ps/nm/km at the operating wavelength, more preferably between about 8 ps/nm/km and 13 ps/nm/km, and even more preferably between about 9 ps/nm/km and 12 ps/nm/km, and/or a ratio of the length of the first span to the length of the second span is less than about 6:1, preferably less than about 4:1. Preferably the half-dispersion-shifted fiber has an attenuation equal to or less than about 0.195 dB/km at the operating wavelength.

In another aspect, the invention is directed to a high-speed optical communications system having an operating wavelength. The high-speed communications system includes a transmission line having first and second spans. Each of the first and second spans has at least one single-mode fiber. The fiber of the first span has a negative dispersion with an absolute value of between about 2.5 ps/nm/km and 10 ps/nm/km at the operating wavelength. The fiber of the second span has a positive dispersion at the operating wavelength. The positive dispersion of the second span compensates for the negative dispersion of the first span such that the cumulative dispersion across the first and second spans is approximately zero. There is also provided a transmitting device coupled to one end of the transmission line and a receiving device coupled to the other end. The transmitting device sends a signal across the transmission line to the receiving device.

Preferably the absolute value of the negative dispersion of the first span is between about 3 and 8 ps/nm/km, more preferably between 4 and 7 ps/nm/km.

Preferably the fiber of the first span has a zero dispersion wavelength of between about 1600 nm and 1670 nm, and the operating wavelength is approximately 1560 nm.

According to an embodiment, the positive dispersion of the second span is between about 10 ps/nm/km and 20 ps/nm/km at the operating wavelength. Preferably a ratio of the length of the first span to the length of the second span is less than about 7:1, more preferably less than about 5:1.

According to another embodiment, the fiber of the second span is a half-dispersion-shifted fiber having a zero dispersion wavelength between about 1350 nm and 1450 nm. In this embodiment, the positive dispersion of the second span is preferably between about 7.5 ps/nm/km and 15.5 ps/nm/km at the operating wavelength, more preferably between about 8 ps/nm/km and 13 ps/nm/km and even more preferably between about 9 ps/nm/km and 12 ps/nm/km, and/or a ratio of the length of the first span to the length of the second span is less than about 6:1, preferably less than about 4:1. The half-dispersion-shifted fiber has an attenuation lower than about 0.210 dB/km at the operating wavelength, preferably lower than about 0.205 dB/km. Even more preferably the half-dispersion-shifted fiber has an attenuation equal to or less than about 0.195 dB/km at the operating wavelength.

In still another aspect, the invention is directed to a method of transmitting a signal over a transmission line. The method includes the step of adding the signal to the transmission line. The signal is transmitted over a first span of single mode optical fiber that has a negative dispersion with an absolute value of between about 2.5 ps/nm/km and 10 ps/nm/km. The signal is then guided down a second span of single mode optical fiber that has a positive dispersion to compensate for the negative dispersion of the first span. The second span of fiber compensates the total dispersion over the transmission line to approximately zero. The signal is then dropped from the transmission line.

Advantageously the signal is added to the transmission line with a transmitting device. Advantageously the signal is dropped from the transmission line with a receiving device.

Preferably the absolute value of the negative dispersion of the fiber of the first span is between about 3 ps/nm/km and 8 ps/nm/km, more preferably between about 4 ps/nm/km and 7 ps/nm/km.

In an embodiment, the fiber of the second span is a half-dispersion-shifted fiber having a zero dispersion wavelength between about 1350 nm and 1450 nm, and/or the ratio of the length of the first span to the second span is less than about 6:1.

In yet another aspect, the invention is directed to a single mode optical transmission fiber. The fiber includes a core and a cladding; the core comprises: an inner core that has a first refractive-index difference. A first glass layer surrounds the inner core and has a second refractive-index difference. The fiber has a peak refractive index difference less than or equal to about 0.0140, a zero-dispersion wavelength of less than about 1450 nm, a dispersion value of between about 7.5 and 15.5 ps/nm/km at an operating wavelength of about 1560 nm, and an effective area of at least 60 $\mu m^2$. The cabled fiber has a cutoff wavelength of less than about 1500 nm.

Advantageously, the peak refractive index difference of the fiber is less than or equal to about 0.0120 and, preferably, the core of the fiber is free from negative refractive index difference layers.

The fiber has an attenuation lower than about 0.210 dB/km at a wavelength of 1560 nm, preferably lower than about 0.205 dB/km and, even more preferably, equal to or lower than about 0.195 dB/km.

In a first embodiment of the fiber the first refractive-index difference is about zero and the second refractive-index difference is greater than zero. Preferably, the second refractive-index difference is about 0.0120.

In a second embodiment the fiber comprises a second glass layer surrounding the first glass layer and having a third refractive-index difference.

In a first version of the second embodiment the second refractive-index difference is greater than the first refractive-index difference and the third refractive-index difference, and each of the first, second, and third refractive-index differences are greater than zero. Preferably, the first refractive-index difference is about 0.0025, the second refractive-index difference is about 0.0070, and the third refractive-index difference is about 0.0017.

In a second version of the second embodiment of the fiber, first refractive-index difference is greater than zero, the second refractive-index difference is about zero, and the third refractive-index difference is greater than zero. The first refractive-index difference can be about 0.0097, in combination with a third refractive-index difference of about 0.0122. Preferably, however, the first refractive-index difference is between about 0.0070 and 0.0120 and the third refractive-index difference is between about 0.0030 and 0.0080.

In yet another aspect, the invention is directed to a high negative dispersion single-mode optical transmission fiber. The fiber includes a core and a cladding; the core comprises: an inner core having a first refractive index difference between about 0.0100 and 0.0160; a first glass layer surrounding the inner core and having a substantially constant refractive index difference, the first refractive index difference of the inner core being greater than the second refractive index difference of the first glass layer. Furthermore, the fiber comprises a second glass layer surrounding the first glass layer and having a third refractive index difference between about 0.0030 and 0.0080. The fiber, when cabled, has a cutoff wavelength less than about 1500 nm. The fiber has a value of dispersion between about −8.0 ps/nm/km and −3.0 ps/nm/km at a wavelength of about 1560 nm. Preferably, the inner core extends to an outer radius of between about 1.9 and 3.0 $\mu m$, and the first glass layer extends from the outer radius of the inner core to an outer radius of between about 3.5 and 8.0 $\mu m$ and the second glass layer has a width of between about 1.5 and 4.0 $\mu m$.

Throughout the present description reference is made to refractive index profiles of optical fibers. The refractive index profiles comprise various radially arranged sections. Reference is made in the present description to precise geometrical shapes for these sections, such as step, alpha-profile, parabola. As is well known to one of ordinary skill in the art, fiber manufacturing process may introduce changes in the shape of the structural sections of the described, idealized, refractive index profiles, such as a central dip in the proximity of the fiber axis and diffusion tails associated with the refractive index peaks. It has been shown in the literature, however, that these differences do not change the fiber characteristics if they are kept under control.

In general, a refractive index profile section has an associated effective refractive index profile section which is different in shape. An effective refractive index profile section may be substituted, for its associated refractive index profile section without altering the overall waveguide performance. For example, see "Single Mode Fiber Optics", Luc B. Jeunhomme, Marcel Dekker Inc., 1990, page 32, section 1.3.2 or U.S. Pat. No. 4,406,518 (Hitachi). It will be understood that disclosing and claiming a particular refractive index profile shape, includes the associated equivalents, in the disclosure and claims.

Moreover, it is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated and constitute a part of this specification, illustrate several embodiments of the invention, and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Unless otherwise indicated, the fiber parameters are referred to a wavelength of 1550 nm.

In accordance with the present invention, a high-speed optical communications system is provided. The high-speed optical communications system includes a transmitting device for adding a signal to a transmission line. A receiver is provided to receive the signal from the transmitting device. An optical communication system is illustrated in FIG. 1 and is generally designated by reference number 10.

Figure 1:
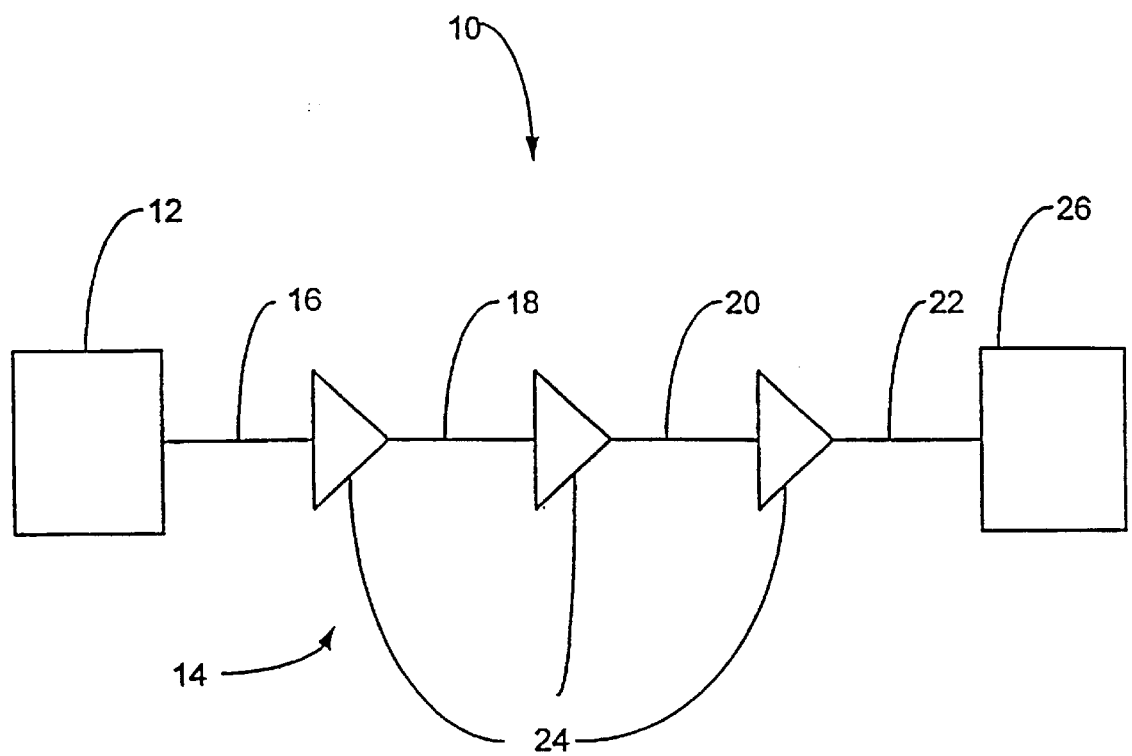
FIG. 1 is a schematic diagram illustrating an optical transmission system in accordance with the present invention.

As illustrated in FIG. 1, the optical communications system 10 includes a transmitting device 12, a transmission line 14, and a receiving device 26. Transmitting device 12 adds a signal to transmission line 14. Preferably, an operating wavelength of the transmitting device is at around 1560 nm.

The present invention contemplates the use of any device or combination of devices readily apparent to one skilled in the art to add the signal to the transmission line. The transmitter 12 could include, for example, a DFB laser modulated directly or externally, e.g. with a Mach-Zehnder interferometer, or a combination of such devices in a WDM configuration. As well, transmitter 12 could comprise wavelength converters for receiving signal wavelengths from a separate transmission network and converting the carrier wavelengths to characteristic wavelengths in a conventional manner.

The optical communication system is capable of supporting any type of communication protocols for the transmitted signals, such as NRZ (non return to zero) or, in alternative, RZ (return to zero), e.g., soliton-like. Furthermore, the system is not limited to a specific bit rate.

In accordance with the present invention, the transmission line 14 includes at least one optical fiber. However, the present invention also contemplates the use of multiple fibers in the same transmission line to increase the signal carrying capacity of the line. The multiple fibers can be bound together to form a cable.

In accordance with the present invention, system 10 may include various optical amplifiers 24 positioned between fiber spans of the transmission line 14. The amplifiers 24 may comprise erbium-doped fiber amplifiers for amplifying signals within the 1550 nm transmission window. As well, system 10 may include an optical add/drop multiplexer (OADM, not shown), for dropping or adding signals to system 10, particularly in a WDM configuration. OADM and amplifiers 24 may be of any type commonly known in the art. Finally, system 10 may include receiver 26 connected directly to optical fiber 22 or coupled to optical fiber 22 through other intermediate components. Receiver 26, as readily known in the field, may include a router, demultiplexer, and the like to assist with deciphering the information carried in the optical signals.

By the term "coupled", it is meant that two physical devices are joined by a common optical path and possibly, although not necessarily, physically adhered. Applicants use the terms "coupled" and "connected" interchangeably in describing the invention, and those of skill in the art will appreciate that the various components identified herein need not be physically attached to each other to provide the optical coupling that assists in achieving the beneficial results of the invention.

As shown in FIG. 1, transmission line 14 includes a first span 16 and second span 18. In the exemplary embodiment, transmission line 14 may also include additional spans 20 and 22. Each span includes at least one single-mode fiber. The present invention also contemplates the use of multiple fibers within each span to increase the signal carrying capacity of the transmission line.

As is well known in the art, the fiber within each span 16, 18, 20 and 22 has a certain attenuation and dispersion at the operating frequency. The cumulative attenuation and dispersion of the signal over the transmission line accumulates as the signal travels through each span. Amplifiers 24 may be placed between the spans 16, 18, 20, and 22 to increase the power of the signal to account for the attenuation of the signal.

The dispersion of the signal may be corrected by connecting fibers that have dispersions with an opposite sign. For example, first span 16 may have a negative dispersion and second span 18 may have a positive dispersion. The negative dispersion of the first fiber will cause the cumulative dispersion to become more negative along the length of fiber 16. The positive dispersion of the second span 18 compensates for the negative dispersion of the first span to bring the cumulative dispersion over the transmission line 14 to approximately zero. Thus, the first and second spans are selected with dispersion values and lengths so that the cumulative dispersion reaches about zero at the termination point of receiver 26.

Figure 2:
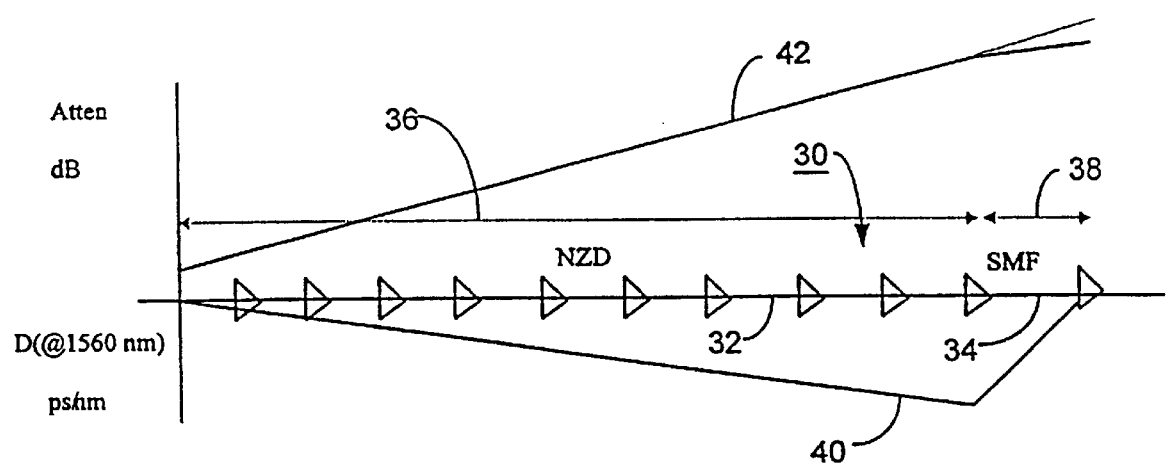
FIG. 2 is a schematic diagram of a transmission line of an optical transmission system according to the prior art, illustrating the cumulative dispersion and attenuation of a signal over the transmission line.

There are many known long distance optical transmission systems. An example of a conventional transmission line having fibers with dispersions of opposite sign is illustrated in FIG. 2. As illustrated in FIG. 2, the conventional transmission line 30 includes a series of negative dispersion fiber spans 32 followed by a positive dispersion fiber span 34. The cumulative attenuation of transmission line 30 is indicated by line 42. Span 34 of single-mode fiber has an attenuation of a lower value than that of spans 32, as shown on line 42 for the overall attenuation of the transmission line. The thin line indicates, for comparison purposes, the attenuation the line would have if span 34 were of the same negative dispersion fiber used for spans 32. The total length of the spans of negative dispersion fiber 32 is indicated by line 36, and the length of positive dispersion fiber 34 is indicated by line 38. The cumulative dispersion of the transmission line at 1560 nm is indicated by line 40.

In this exemplary embodiment of a conventional transmission line, negative dispersion fiber span 32 is composed of conventional Non-Zero Dispersion (NZD) fiber. The NZD fiber has a negative dispersion of approximately −2 ps/nm/km at 1560 nm and an attenuation of approximately 0.210 dB/km. As shown in FIG. 2, these values cause the cumulative dispersion of line 40 to gradually decrease in absolute value and the cumulative attenuation of line 42 to gradually increase along the fiber spans 32 of the length 36. In contrast, the positive dispersion span 34 is conventionally composed of single-mode fiber (SMF) having a dispersion of approximately +18 ps/nm/km at 1560 nm and an attenuation of approximately 0.190 dB/km. As shown in FIG. 2, these values for the SMF fiber cause the cumulative dispersion of line 40 to approach zero level and the cumulative attenuation of line 42 to increase at a lower rate than a corresponding NZD fiber along the fiber span 34 of length 38. The lengths of negative dispersion span 36 and positive dispersion span 38 are sized such that the total dispersion 40 of the transmission line approaches approximately zero at the end of the transmission line.

Alternatively, transmission lines as shown in FIG. 2 may use a Pure Silica Core (PSC) fiber to compose the positive dispersion span 34. This fiber has a dispersion of about +19 ps/nm/km at 1560 nm and an attenuation of about 0.180 dB/km. In comparison with the typically used SMF fiber, the PSC fiber has a lower attenuation and slightly higher dispersion. As shown in the examples that follow, the use of this fiber will result in a smaller attenuation over the entire system than that of the SMF fiber.

In accordance with the present invention, the transmission line includes a first span having at least one single-mode fiber having a negative dispersion value at the operating wavelength, exceeding in absolute value the dispersion value for conventional NZD fiber. Preferably, the first span comprises a High Negative Dispersion Fiber (HNDF), with an absolute value of the negative dispersion between about 2.5 ps/nm/km and 10 ps/nm/km at the operating wavelength, which is in excess of the dispersion value for conventional NZD fiber. Preferably, the absolute value of the negative dispersion of the High Negative Dispersion Fiber at the operating wavelength is between about 3 ps/nm/km and 8 ps/nm/km. More preferably, the absolute value of the negative dispersion of the High Negative Dispersion Fiber at the operating wavelength is between about 4 ps/nm/km and 7 ps/nm/km.

Figure 3:
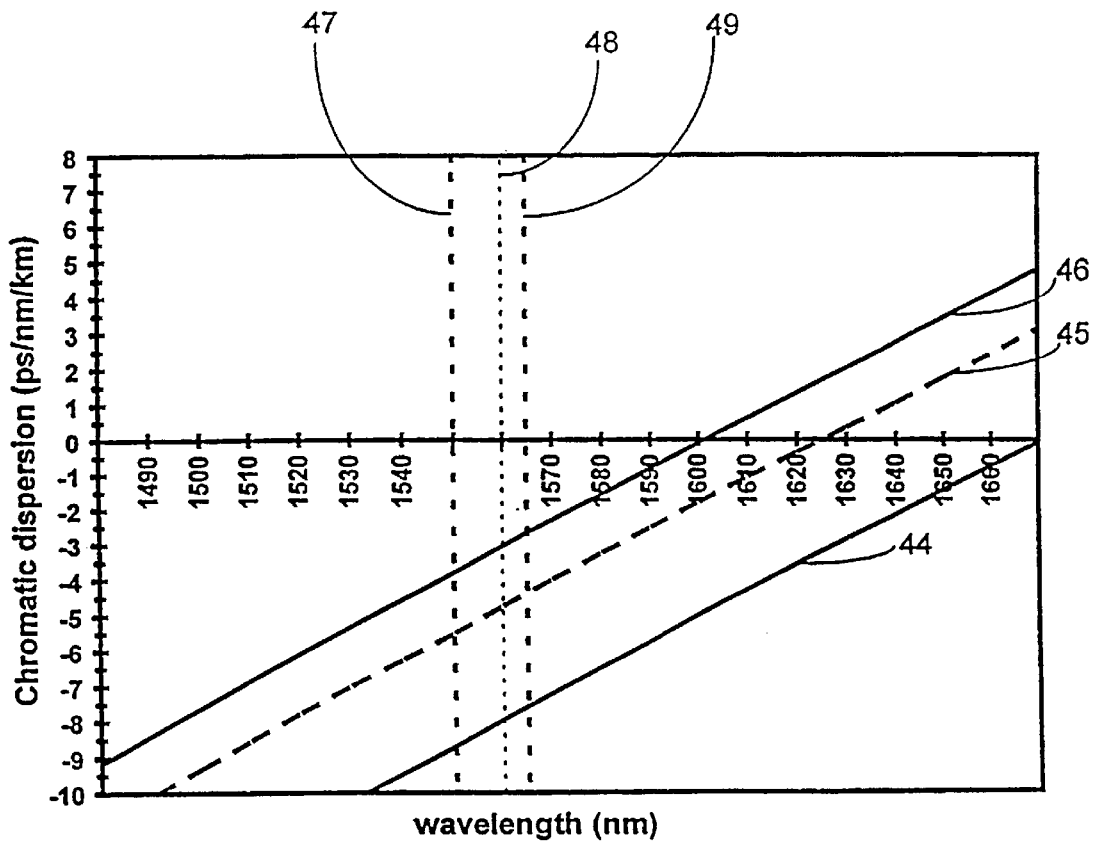
FIG. 3 is a graph relating dispersion to wavelength for a preferred embodiment of a fiber having a negative dispersion.

An exemplary embodiment of the dispersion curve of the negative dispersion fiber contemplated by the present invention is illustrated in FIG. 3. The dispersion value of the fiber at different operating wavelengths is indicated by line 45. As indicated by lines 44 and 46, the actual dispersion of the fiber may vary due to production tolerances. As shown in FIG. 3, the zero-dispersion wavelength is between about 1600 nm and 1670 nm. At the preferred operating wavelength of 1560 nm referenced by line 48, the absolute value of the dispersion of the fiber is preferably between about 3 ps/nm/km and 8 ps/nm/km. Vertical lines 47 and 49 indicate a possible wavelength band of amplification for contemplated systems (1550–1565 nm).

Figure 4:
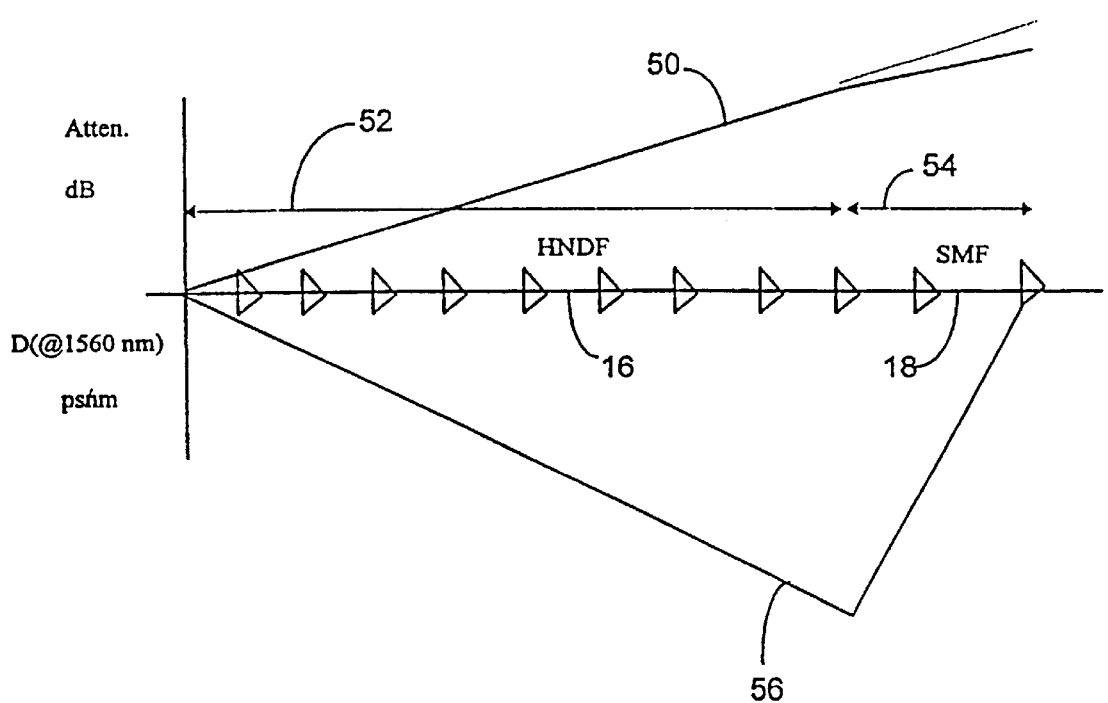
FIG. 4 is a schematic diagram of a preferred embodiment of a transmission line according to the present invention, illustrating the cumulative dispersion and attenuation of a signal over the transmission line.

FIG. 4 depicts an optical-transmission line according to an embodiment of the present invention. As illustrated in FIG. 4, the first series of spans of negative dispersion fiber 16 is followed by a second series of spans 18 of fiber having a positive dispersion. The length of the negative dispersion span is indicated by line 52 and the length of the positive dispersion span is indicated by line 54. The total dispersion of transmission line 14 at 1560 nm is indicated by line 56 and the total attenuation of the transmission line 14 is indicated by line 50.

Figure 5:
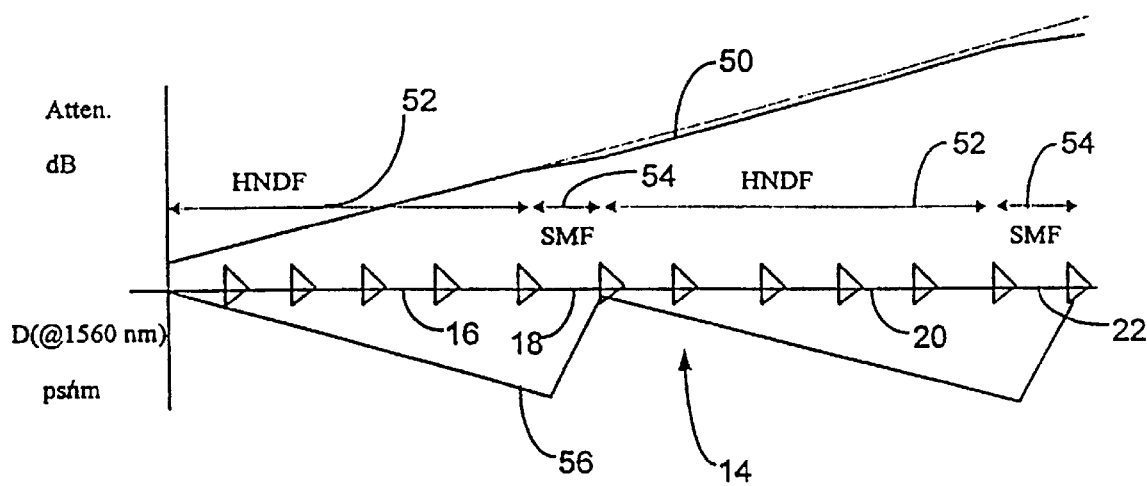
FIG. 5 is a schematic diagram of another embodiment of a transmission line according to the present invention, illustrating the cumulative dispersion and attenuation of a signal over the transmission line.

An alternative embodiment of the present invention is illustrated in FIG. 5. In this embodiment, transmission line 14 includes several spans 16, 18, 20, and 22 of fiber having alternating values of dispersion. As shown in FIG. 5, spans 16 and 20 have a negative dispersion, using High Negative Dispersion Fiber (HNDF) as an example, and spans 18 and 22 have a positive dispersion. The lengths of the negative dispersion spans 16 and 20 are indicated by lines 52. The lengths of the positive dispersion spans 18 and 22 are indicated by lines 54. The total attenuation is indicated by line 50 and the total dispersion is indicated by line 56. Lengths 52 and 54 are chosen such that the total dispersion of transmission line 14 reaches approximately zero at the end of the transmission line. By interspersing the compensating positive dispersion fiber along the line, the maximum dispersion value of the transmission line can be maintained, while also achieving decreased attenuation and reduced non-linear effects.

The present invention contemplates that the negative dispersion fiber may have any refractive-index profile that is readily apparent to one skilled in the art as capable of achieving the transmission characteristics described herein. The refractive-index may have, for example, a peak-and-ring shape, where a refractive-index peak occurs both in the fiber's center and at an outer radius.

Figure 6:
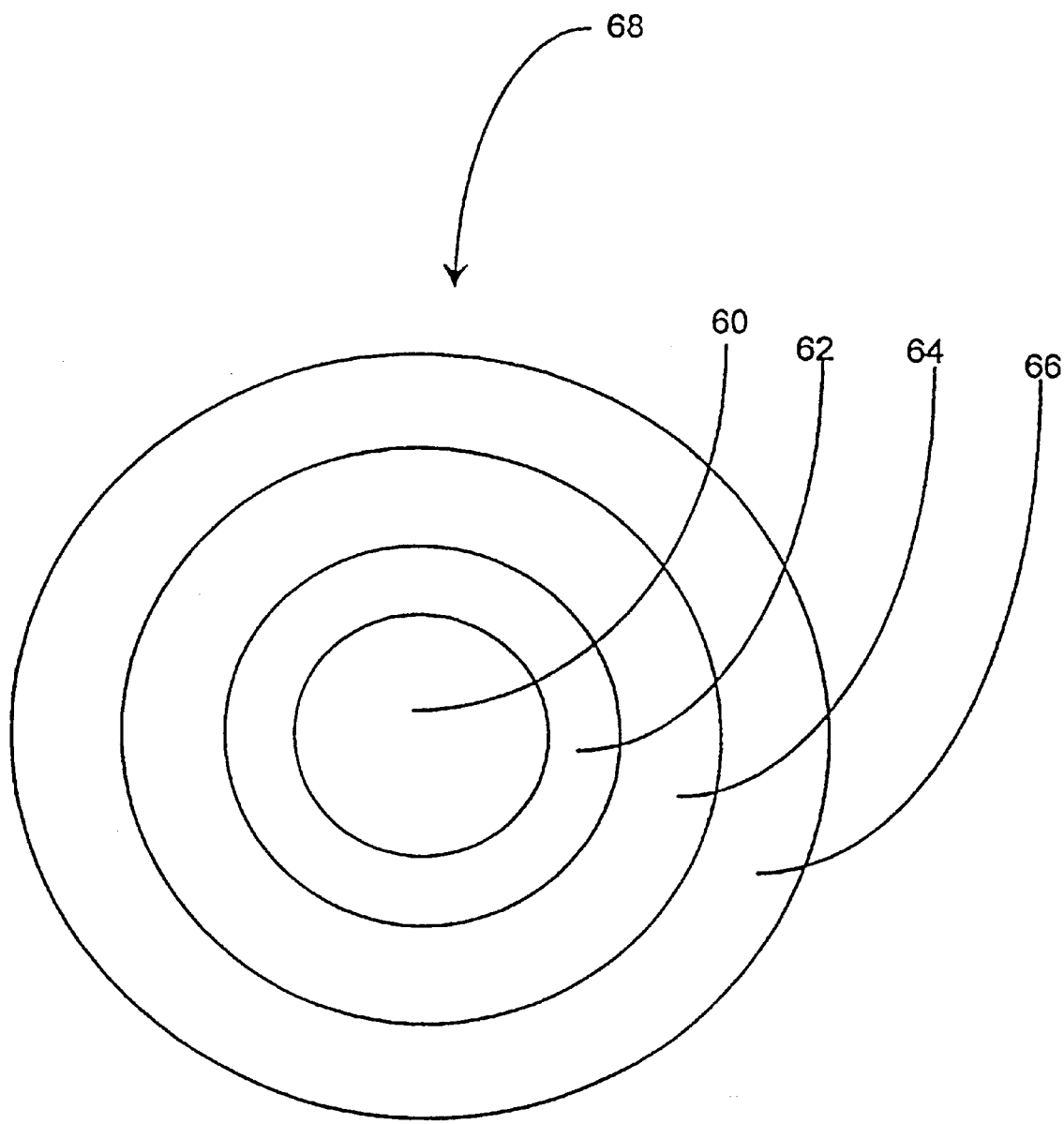
FIG. 6 is a cross sectional view of a preferred embodiment of a fiber according to the present invention.
Figure 7:
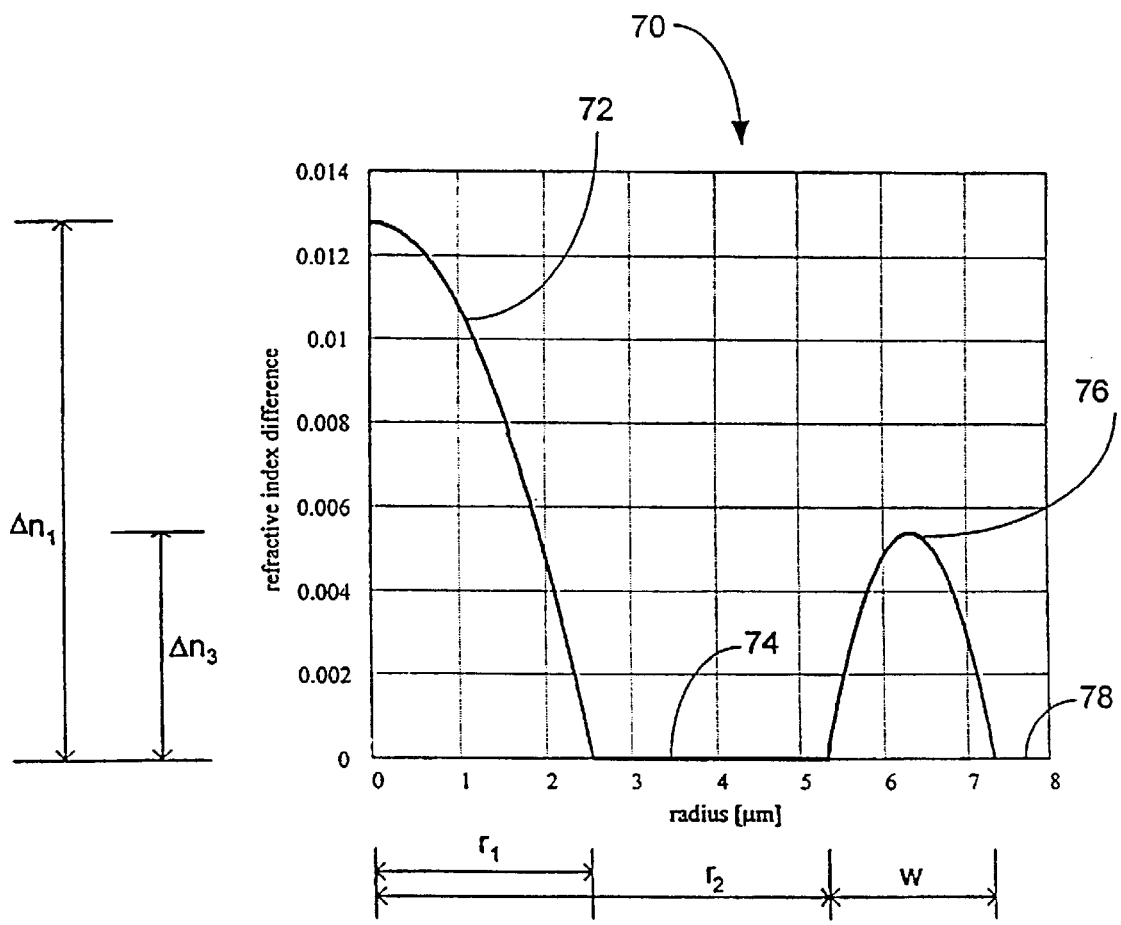
FIG. 7 is graph illustrating the refractive-index profile of an embodiment of a Half Negative Dispersion Fiber (HNDF) having a negative dispersion for use in the present invention.

An example of fiber 68 that has a negative dispersion and achieves suitable transmission characteristics with a peak-and-ring shape is illustrated in FIGS. 6 and 7. As shown in FIG. 6, fiber 68 includes an inner core 60, a first glass layer 62, a second glass layer 64, and a cladding 66. Inner core 60, first glass layer 62, and second glass layer 64 each have a certain refractive-index difference. As readily known to those of ordinary skill in the art, refractive-index difference refers to the relative difference in refractive index between a given layer of glass and refractive index of pure silica ($SiO_2$). That is, the refractive-index difference $\Delta n_1$ of inner core 60 equals ($n_1 - n_{silica}$). The refractive-index profile for this exemplary fiber is shown in FIG. 7. As shown in FIG. 7, the peak-and-ring profile 70 is characterized by a first peak 72 and a second peak 76, separated by an area of substantially constant refractive index 74. A cladding with substantially constant refractive index 78 surrounds second peak 76.

Inner core 60 has a radius $r_1$ (referring to FIG. 7) that is between about 1.9 and 3.0 μm, preferably between about 2.2 and 2.7 μm. In an example $r_1$ is about 2.5 μm. Between the center of the fiber and its outer radius, inner core 60 includes a refractive index-increasing dopant, such as $GeO_2$ or the like, that produces a peak index of refraction at or near the axial center of fiber 68 and a minimum for the inner core at its outer radius. At the peak, the refractive-index difference $\Delta n_1$ is between about 0.0100 and 0.0160, preferably between about 0.0120 and 0.0140. In an example $\Delta n_1$ is about 0.0128. The concentration of the refractive index-increasing dopant decreases from the center of core 60 to the outer radius in a manner to produce a profile having a curved slope that corresponds to graded index a profile. The curved slope has a substantially parabolic shape with an α of about 2.

First glass layer 62 surrounds the inner core 60 and is characterized by an index of refraction across its width that is less than the indices of refraction along the radius of inner core 60. Preferably, first glass layer 62 is made of glass with a refractive-index difference of about 0. First glass layer 62 extends from the outer radius of inner core 60 to a radius $r_2$ of between about 3.5 and 8.0 μm, preferably between about 4.0 and 5.5 μm. In an example, $r_2$ is of about 5.3 μm.

The second glass layer 64 surrounds the first glass layer 62. Second glass layer 64 extends for a width w of between about 1.5 and 4.0 µm, preferably between about 1.6 and 3.4 µm. In an example w is of about 2.0 µm. As shown in FIG. 6, second glass layer 64 has a maximum index of refraction $\Delta n_3$ within its width. Second glass layer 64, like inner core 60, has its refractive-index difference increased by doping the width of the glass layer with $GeO_2$ or other well-known refractive index-increasing dopants. Second glass layer 64 has a refractive index profile substantially corresponding to an α profile, with α of about 2. Preferably, second glass layer 64 has a maximum refractive-index difference $\Delta n_3$ of between about 0.0030 and 0.0080, preferably between about 0.0035 and 0.0060. In an example, $\Delta n_3$ is about 0.0054.

Finally, a light conducting cladding 66 surrounds the second glass layer 64 in a conventional manner to help guide light propagating along the axis of fiber 68. Cladding 66 preferably has a refractive-index difference substantially equal to 0, but may include dopants that do not raise its index of refraction above that of the maximum indices of refraction 72 and 76 of the inner core and the second layer.

As indicated above, refractive index differences are usually referred to the refractive index of pure silica ($\Delta n = n - n_{silica}$). Furthermore, following the standard notation in the field of optical fibers, it is understood throughout the present description and claims that refractive index differences are referred to the cladding ($\Delta n = n - n_{cladding}$) whenever the cladding includes dopants that make the refractive index of the optical cladding in the drawn fiber different from the refractive index of pure silica.

Fiber 68 having refractive-index profile 70 of FIG. 7 has the following transmission characteristics: a cabled cut-off wavelength of less than 1500 nm, a dispersion of between about −8.0 ps/nm/km and −3.0 ps/nm/km at 1560 nm, an effective area of greater than 50 µm² at 1550 nm, a macrobending coefficient of less than 10 dB/km, and a microbending coefficient of less than 12 (dB/km)/(g/mm).

If the fiber profile parameters are within the given preferred range, fiber 68 having refractive-index profile 70 of FIG. 7 has the following preferred transmission characteristics: a cabled cut-off wavelength of less than 1500 nm, a dispersion of between about −7.0 ps/nm/km and −4.0 ps/nm/km at 1560 nm, an effective area of greater than 60 µm² at 1550 nm, a macrobending coefficient of less than 0.05 dB/km, and a microbending coefficient of less than 6 (dB/km)/(g/mm).

In the described example, fiber 68 has the following transmission characteristics: a cabled cut-off wavelength of less than 1500 nm, a dispersion of about −4.5 ps/nm/km at 1560 nm and −5.6 ps/nm/km at 1550 nm, a dispersion slope of 0.11 ps/nm²/km at 1550 nm, a mode field diameter of 8.7 µm at 1550 nm, an effective area of 60 µm² at 1550 nm, a macrobending coefficient of 0.01 dB/km, and a microbending coefficient of 3.5 (dB/km)/(g/mm).

In the framework of the present work the macrobending coefficient is referred to a loss measurement at 1550 nm for the fiber bent on a 60 mm diameter mandrel, while the microbending coefficient is referred to a measurement at 1550 nm according to the expandable bobbin method, as described for example in G. Grasso and F. Meli "Microbending losses of cabled single-mode fibers", ECOC '88, pp. 526-ff., or in G. Grasso et al. "Microbending effects in single-mode optical cables", International Wire and Cable Symposium, 1988, pp. 722-ff.

In the exemplary embodiments illustrated in FIGS. 3, 4, and 5, the negative dispersion span 16 is composed of High Negative Dispersion Fiber (HNDF) preferably having a dispersion of about −4.5 ps/nm/km and an attenuation equal to or less than 0.210 dB/km at 1560 nm. This fiber has an effective area of at least about 50 µm². The positive dispersion span 18 is composed of conventional SMF fiber having a positive dispersion of about +18 ps/nm/km and an attenuation of about 0.190 dB/km at 1560 nm.

Comparing FIGS. 4 and 5 with FIG. 2, it is apparent that the present invention provides a transmission fiber with several spans having a dispersion value that decreases more negatively than that used conventionally. As well, the arrangement includes the use of several spans of positive-dispersion fiber 18, which lowers the overall attenuation and non-linear effects compared with conventional arrangements. The length of the negative span 52 and the length of the positive span are chosen such that the positive dispersion will compensate for the negative dispersion span to bring the total dispersion 56 to approximately zero. Preferably, the ratio of the negative dispersion span length to the positive dispersion span length will be less than about 7:1, more preferably less than 5:1.

Because the dispersion of the negative span of the present invention is greater than the dispersion of the corresponding span of the conventional line, the length of the positive span in the present invention must be greater to compensate for the increased dispersion. Because the attenuation of the positive span is less than the attenuation of the negative span and the length of the negative span is decreased, the overall attenuation of the line is, therefore, also reduced.

In addition, by transmitting the signal at a wavelength where the dispersion has an absolute value that is significantly greater than zero along the whole line, the problem of FWM and XPM is avoided even with dense channel spacing and high signal power, as previously discussed. Thus, the transmission line of the present invention is well suited for use with Dense and Hyper Dense WDM technology, where channel spacing is smaller or equal to 0.8 nm.

In addition, the transmission line of the present invention is less susceptible to all non-linear effects, including SPM, SBS, and SRS. This is due to the fact that in the present invention the length of the positive dispersion span portion, which has an effective area greater than the negative dispersion span portion, is greater than the length of the positive dispersion span portion of conventional systems.

In accordance with the present invention, the positive dispersion fiber of the second span may be a half-dispersion-shifted fiber (HDSF). The half-dispersion-shifted fiber has an attenuation equal to or less than about 0.210 dB/km at a wavelength of 1560 nm, a zero-dispersion wavelength between 1350 nm and 1450 nm, a peak refractive index difference of less than or equal to about 0.0140, and an effective area of at least 60 µm². The cabled fiber has a cutoff wavelength of less than about 1500 nm. Preferably the half-dispersion-shifted fiber has an attenuation equal to or less than about 0.205 dB/km, even more preferably equal to or less than about 0.195 dB/km at a wavelength of 1560 nm. Advantageously, the peak refractive index difference is less than or equal to about 0.0120. Preferably, the effective area is of at least 70 µm², and even more preferably of at least 80 µm². Advantageously, the core of the half-dispersion-shifted fiber is free from negative refractive index difference layers. The dispersion at the preferred operating wavelength of 1560 nm is between about 7.5 ps/nm/km and 15.5 ps/nm/km, preferably between about 8 ps/nm/km and 13 ps/nm/km, even more preferably between about 9 ps/nm/km and 12 ps/nm/km. Thus, the half-dispersion-shifted fiber has a lower dispersion than the conventionally used SMF fiber and than PSC fiber. To account for the lower dispersion, a longer span of half-dispersion-shifted fiber will be needed to compensate for the negative dispersion. The present invention contemplates that the ratio of negative dispersion fiber to half-dispersion-shifted fiber will be not greater than about 6:1, preferably not greater than about 4:1. As shown in the examples set forth below, the use of half-dispersion-shifted fiber will result in a reduction in total attenuation over the system as well as in a reduction of overall non-linear effects. Another advantage of the half-dispersion-shifted fiber is relatively low attenuation, in connection with a low dopant content achieved by relatively low values for the peak refractive index difference. The embodiments of the half-dispersion-shifted fiber having no down-doped areas in the core, i.e., no negative refractive index difference layers, achieve the additional advantage of a reduced attenuation resulting from the relatively low dopant content. Moreover, avoidance of down dopants, such as fluorine, significantly simplifies the production process.

The present invention contemplates that the half-dispersion-shifted fiber may have any refractive-index profile that is readily apparent to one skilled in the art as capable of achieving the transmission characteristics described herein. The refractive index may have, for example, a peak-on-pedestal shape, a double-peak shape, or a ring shape. Double-peak profile fibers are disclosed in patent application EP99110784.8 assigned to the same Assignee of the present application.

Figure 8:
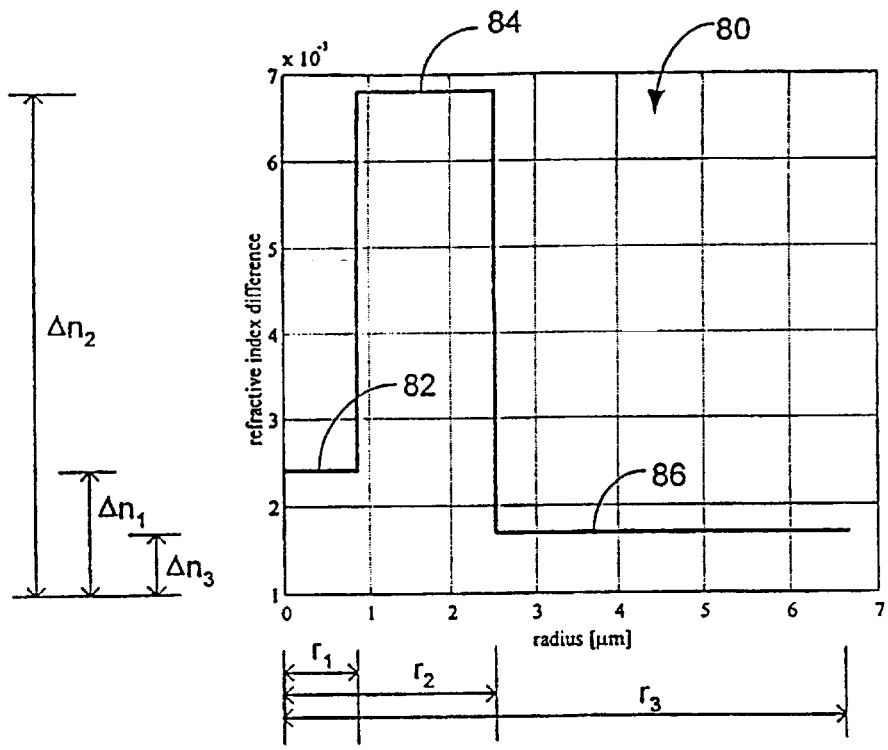
FIG. 8 is a graph illustrating the refractive-index profile of an embodiment of a half-dispersion-shifted fiber having a positive dispersion.

A peak-on-pedestal profile for a half-dispersion-shifted fiber 18 is illustrated in FIG. 8. Fiber 18 has a cross section similar to that illustrated in FIG. 6, and includes an inner core 60, a first glass layer 62, a second glass layer 64, and a cladding 66. The various layers comprising the optical fiber of FIG. 8 may contain refractive index-modifying dopants each as $GeO_2$ or other well-known dopants to vary the refractive-index profile. The choice of dopants and concentrations to attain the disclosed profiles is within the skill of the ordinary artisan.

As shown in FIG. 8, the peak-on-pedestal refractive-index profile 80 is characterized by an inner area 82, a peak 84, and an outer area (pedestal) 86. Inner core 60 forms inner area 82 and has a radius $r_1$ (referring to FIG. 8) of about 0.9 μm and a refractive-index difference $\Delta n_1$ of about 0.0024. First glass layer 62 forms peak 84 and extends from the outer radius of the inner core to an outer radius $r_2$ of about 2.6 μm and has a refractive-index difference $\Delta n_2$ of about 0.0070. Second glass layer 64 forms outer area 86 and extends to an outer radius $r_3$ of about 6.6 μm and has a refractive-index difference $\Delta n_3$ of about 0.0017. This refractive-index profile 80 yields a fiber having the following transmission characteristics: a cut-off wavelength for the cabled fiber of less than 1450 nm, a dispersion of 14.6 ps/nm/km at the 1560 nm wavelength, a dispersion slope of 0.068 ps/nm$^2$/km, a mode field diameter of 10.9 μm, an effective area of 88 μm$^2$, a non-linearity coefficient of 0.98 $W^{-1}km^{-1}$, a macrobending coefficient of 1 dB/km, and a microbending coefficient of 6.1 (dB/km)/(g/mm).

Figure 9A:
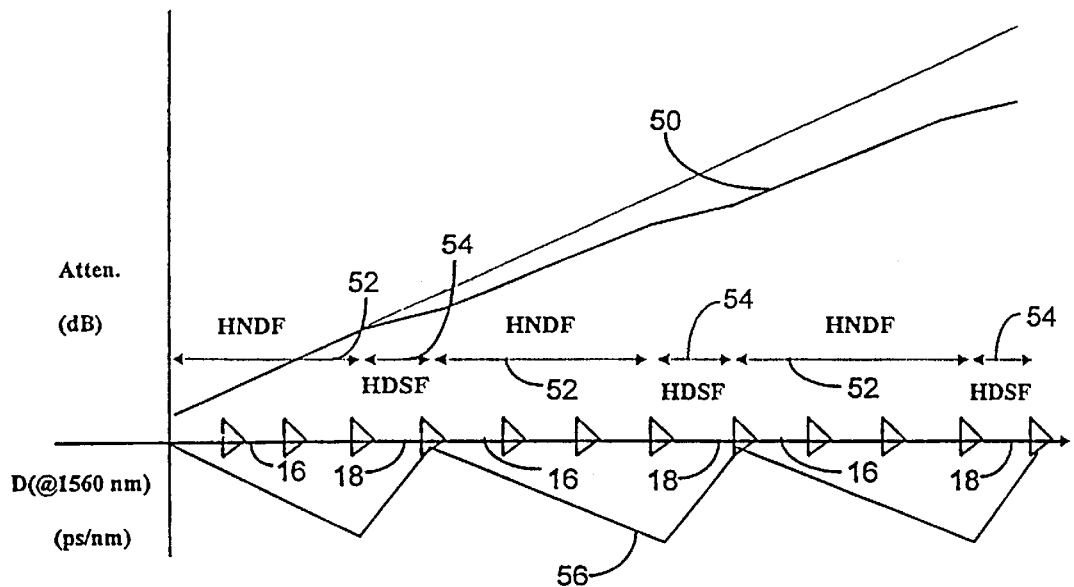
FIG. 9a is a schematic of another embodiment of a transmission line according to the present invention, illustrating the cumulative dispersion and attenuation of a signal over a transmission line that combines spans of HNDF fiber and half-dispersion-shifted fiber.

FIG. 9a depicts a third embodiment of the optical-transmission line according to the present invention. In this embodiment, negative dispersion spans 16 are HNDF fiber having a dispersion of about −4.5 ps/nm/km and an attenuation of about 0.210 dB/km at 1560 nm. Positive dispersion spans 18 are half-dispersion shifted fiber having a dispersion of about 11 ps/nm/km and an attenuation of about 0.195 at 1560 nm. The lengths of negative dispersion spans 16 are indicated by lines 52 and the lengths of positive dispersion spans 18 are indicated by lines 54. The cumulative dispersion of the transmission line at 1560 nm is indicated by line 56, and the cumulative attenuation of the transmission line is indicated by line 50.

The following tables illustrate the attenuation gain of the various embodiments of the transmission system of the present invention as compared to the conventional transmission systems. Each example is based on transmission line having a length of 800 km.

Table 1 identifies the fiber specifications of two system configurations including a conventional system and a system using NZD and PSC fiber as compared to three exemplary embodiments of the present invention, i.e., the High Negative Dispersion Fiber (HNDF) used with either a single-mode fiber (SMF), a pure silica core fiber (PSC), or a half-dispersion-shifted fiber (HDSF).

TABLE 1

| System Type | Neg. Disp. Fiber Type/ Disp. Value (ps/nm/km) at 1560 nm | Length (km)/ Attenuation (dB/km) at 1560 nm | Pos. Disp. Fiber type/ Disp. Value (ps/nm/km) at 1560 nm | Length (km)/ Attenuation (dB/km) at 1560 nm |
|---|---|---|---|---|
| Config. #1 | NZD/−2 | 720/0.210 | SMF/+18 | 80/0.190 |
| Config. #2 | NZD/−2 | 725/0.210 | PSC/+19 | 75/0.180 |
| Embod. #1 | HNDF/−4.5 | 640/0.210 | SMF/+18 | 160/0.190 |
| Embod. #2 | HNDF/−4.5 | 648/0.210 | PSC/+19 | 152/0.180 |
| Embod. #3 | HNDF/−4.5 | 560/0.210 | HDS/+11 | 240/0.195 |

Table 2 summarizes the total system attenuation for each system in Table 1 and shows the improvement (decrease) in attenuation as compared to the conventional system.

TABLE 2

| System Type | Total System Attenuation (dB) at 1560 nm | Attenuation Decrease at 1560 nm (dB) |
|---|---|---|
| Configuration #1 | 166.4 | — |
| Configuration #2 | 165.7 | 0.7 |
| Embodiment #1 | 164.8 | 1.6 |
| Embodiment #2 | 163.4 | 3.0 |
| Embodiment #3 | 164.4 | 2.0 |

As shown in Tables 1 and 2, the selection and arrangement of optical fibers for the embodiments of the present invention lead to an improved attenuation and lower non-linear effects than in a conventional system. In particular, as shown in Table 2, the embodiments of the invention using SMF, PSC, and HDSF fiber lower the system attenuation by 1.6 dB, 3.0 dB, and 2.0 dB, respectively.

Figure 9B:
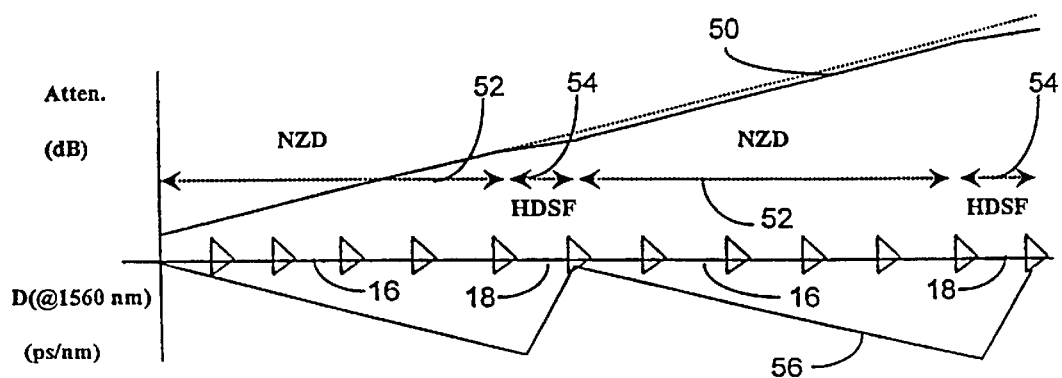
FIG. 9b is a schematic of another embodiment of a transmission line according to the present invention, illustrating the cumulative dispersion and attenuation of a signal over a transmission line that combines spans of HDSF fiber and NZD fiber.

FIG. 9b depicts a fourth embodiment of the optical-transmission line according to the present invention. In this embodiment, negative dispersion spans 16 are NZD fiber having a dispersion of about −2 ps/nm/km and an attenuation of about 0.210 dB/km at 1560 nm. Positive dispersion spans 18 are HDSF fibers having a dispersion of about +11 ps/nm/km and an attenuation of about 0.195 at 1560 nm. The lengths of negative dispersion spans 16 are indicated by lines 52 and the lengths of positive dispersion spans 18 are indicated by lines 54. The cumulative dispersion of the transmission line at 1560 nm is indicated by line 56, and the cumulative attenuation of the transmission line is indicated by line 50.

Table 3 identifies the fiber specifications of a fourth exemplary embodiment of the present invention, i.e., the Non Zero Dispersion (NZD) fiber used with the half-dispersion-shifted fiber (HDSF).

TABLE 3

| System Type | Neg. Disp. Fiber Type/ Disp. Value (ps/nm/km) at 1560 nm | Length (km)/ Attenuation (dB/km) at 1560 nm | Pos. Disp. Fiber type/ Disp. Value (ps/nm/km) at 1560 nm | Length (km)/ Attenuation (dB/km) at 1560 nm |
| --- | --- | --- | --- | --- |
| Embod. #4 | NZD/−2 | 670/0.210 | HDSF/+11 | 130/0.195 |

Table 4 summarizes the total system attenuation for the system in Table 3 and shows the improvement (decrease) in attenuation as compared to the conventional system.

TABLE 4

| System Type | Total System Attenuation (dB) at 1560 nm | Attenuation Decrease at 1560 nm (dB) |
| --- | --- | --- |
| Embodiment #4 | 166 | 0.3 |

Figure 10:
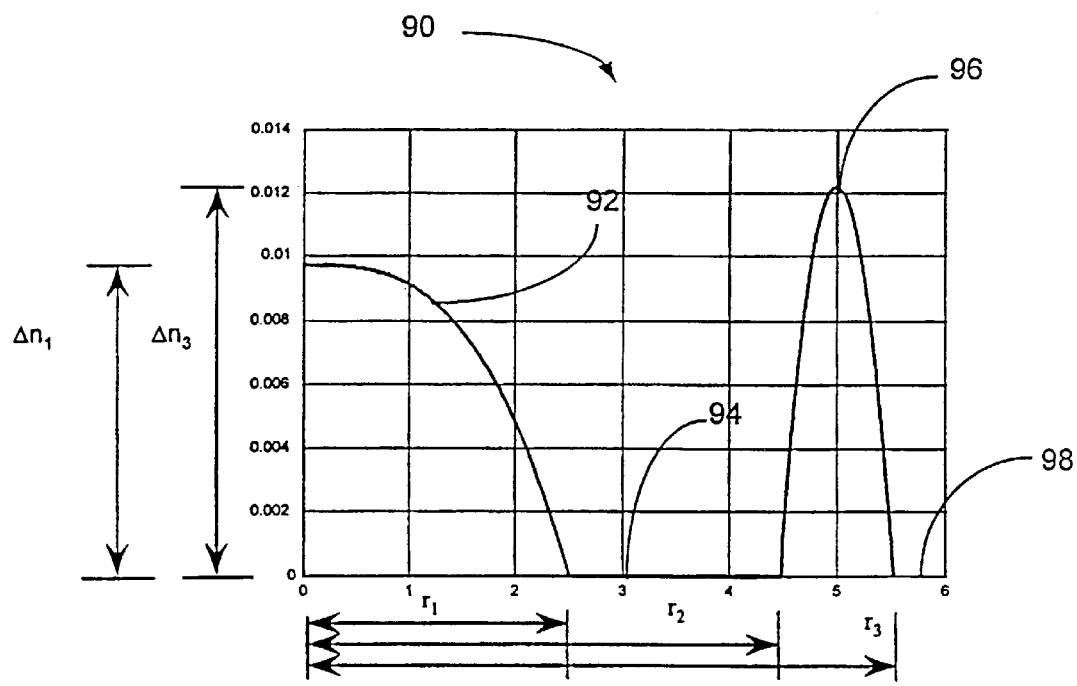
FIG. 10 is a graph illustrating the refractive-index profile of another embodiment of a half-dispersion-shifted fiber having a positive dispersion.

In another embodiment of the present invention and as shown in FIG. 10, the half-dispersion-shifted fiber may have a refractive-index profile 90 with a double-peak profile. The double-peak profile is characterized by a first peak 92 and a second peak 96. First peak 92 is separated from second peak 96 by an area having a substantially constant refractive index 94.

As shown in the cross-section of a first embodiment of a fiber 68 in FIG. 6, the axial center of the fiber is an inner core 60 that forms peak 92 (referring to FIG. 10) having a first maximum refractive-index difference $\Delta n_1$ and a radius $r_1$. Inner core 60 preferably is made of $SiO_2$ doped with a substance that increases the refractive index of pure $SiO_2$, such as $GeO_2$.

A first glass layer 62 surrounds the inner core 60 and is characterized by an index of refraction across its width that is less than the indices of refraction of inner core 60. Preferably, first layer 62 has a refractive-index difference substantially equal to 0.

A second glass layer 64 surrounds the first glass layer 62 and forms second peak 96. Second glass layer 64 has a maximum index of refraction $\Delta n_3$ within its width. Finally, a cladding 68 surrounds the second glass layer 64 in a conventional manner to help guide light propagating along the axis of the fiber. Cladding 68 has a refractive-index difference $\Delta n_3$ substantially equal to 0. If cladding 68 includes some refractive-index-modifying dopant, the cladding should have an index of refraction across its width that is less than the maximum indices of refraction within both inner core 60 and second layer 64.

As shown in FIG. 10, in a preferred embodiment of a half-dispersion-shifted fiber with a double-peak shape, inner core 60 has a radius $r_1$ that preferably is about 2.5 μm. Between the center of the fiber and the radial position at 2.5 μm, inner core 60 includes a refractive-index-increasing dopant such as $GeO_2$ or the like that produces a peak index of refraction at or near the axial center of the fiber and a minimum for the inner core at its outer radius. At the peak, the index of refraction $\Delta n_1$ is preferably about 0.0097. The concentration of the refractive-index-increasing dopant decreases from the center of inner core 60 to the outer radius at about 2.5 μm in a manner to produce an α-profile having a equal to about 3.

First glass layer 62 has a substantially constant refractive-index difference $\Delta n_2$ that is less than $\Delta n_1$. As shown in FIG. 10, the preferred refractive-index difference $\Delta n_2$ for the first glass layer 62 is about 0. First glass layer 62 has an outer radius $r_2$ that is preferably about 4.5 μm.

Second glass layer 64, like inner core 60, has its refractive-index difference increased by doping the width of the glass layer with $GeO_2$ or other well-known refractive-index-increasing dopants. Second glass layer 64 has a substantially parabolic profile across its radius that culminates in a maximum refractive-index difference $\Delta n_3$ that exceeds the maximum refractive-index difference $\Delta n_2$ of first glass layer 62. The index of refraction $\Delta n_3$ of second glass layer 64 at its peak is between about 0.0110 and 0.0140 and preferably of about 0.0122. Second glass layer 34 extends to an outer radius $r_3$ of about 5.5 μm.

Cladding 66 has a refractive-index difference substantially equal to 0. Cladding 66 preferably is pure $SiO_2$ glass but may include dopants that do not raise its index of refraction above that of the maximum indices of refraction 92 and 96 of the inner core and the second layer.

This double-peak refractive-index profile 90 yields a fiber having the following transmission characteristics: a cut-off wavelength of less than 1450 nm, a dispersion of 11.2 ps/nm/km at the 1560 nm wavelength, a dispersion slope of 0.084 ps/nm²/km, a mode field diameter of 10.4 μm, an effective area of 91 μm², a non-linearity coefficient of 0.97 $W^{-1}km^{-1}$, a macrobending coefficient of $10^{-2}$ dB/km, and a microbending coefficient of 6.1 (dB/km)/(g/mm).

Figure 11:
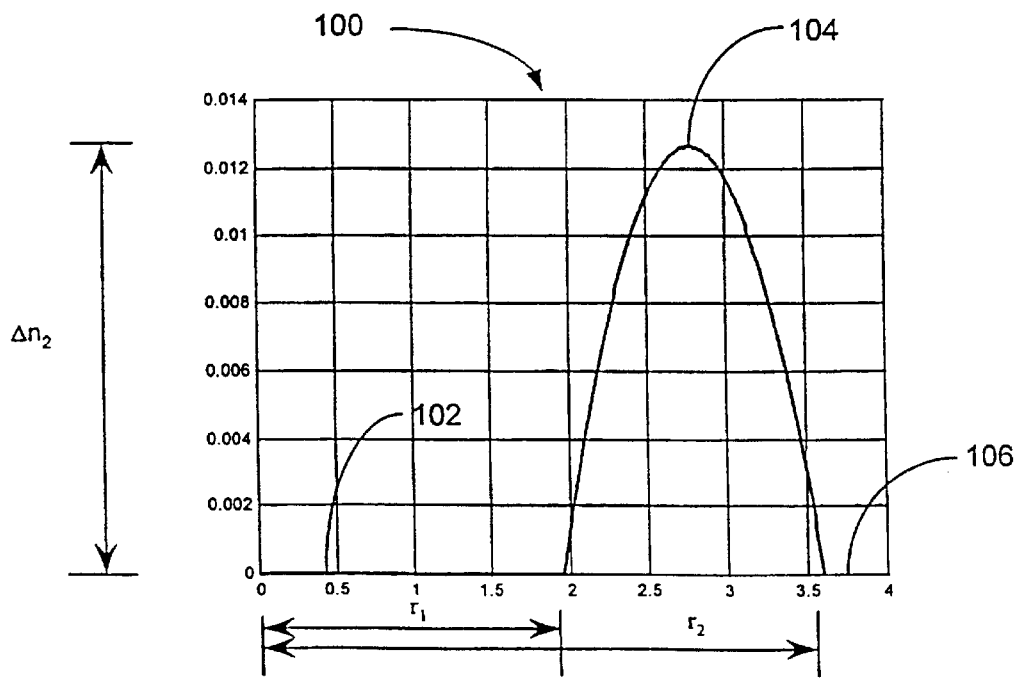
FIG. 11 is a graph illustrating the refractive-index profile of still another embodiment of a half-dispersion-shifted fiber having a positive dispersion.

As shown in FIG. 11, in another embodiment of a half-dispersion-shifted fiber, the refractive-index profile 100 may also have a ring shape. This shape is characterized by an area of constant refractive index 102 surrounded by a peak 104. As shown in the cross-section of an embodiment of the fiber in FIG. 6, the axial center of the fiber is an inner core 60 that has a first maximum refractive-index difference $\Delta n_1$ and a radius $r_1$. Inner core 60 preferably is free from fluorine and has a refractive-index difference of 0.

A first glass layer 62 surrounds the inner core 60 along the length of the fiber. First glass layer 62 has a maximum index of refraction $\Delta n_2$ within its width that exceeds the maximum index of refraction of the glass $\Delta n_1$ within inner core 60. Finally, cladding 64, 66 surrounds the first glass layer 62 in a conventional manner to help guide light propagating along the axis of the fiber. Cladding 64, 66 may comprise glass with a refractive-index difference $\Delta n_3$ substantially equal to 0. If cladding 64, 66 includes some refractive-index-modifying dopant, the cladding should have an index of refraction across its width that is less than the maximum indices of refraction within first layer 104.

As shown in FIG. 11, according to an embodiment of the present invention, inner core 60 has a radius $r_1$ that preferably is about 2.0 μm. First glass layer 62 has a refractive-index difference increased by doping the width of the glass layer with $GeO_2$ or other well-known refractive-index-increasing dopants. First glass layer 62 has a substantially parabolic profile across its radius that culminates in a maximum refractive-index difference $\Delta n_2$ that exceeds the maximum refractive-index difference $\Delta n_1$ of glass core 60. The index of refraction $\Delta n_2$ of first glass layer 62 at its peak preferably is about 0.0126. First glass layer 62 has a width that preferably is about 1.6 μm, so that the outer radius $r_2$ of layer 62 is about 3.6 μm.

This ring shaped refractive-index profile 100 yields a fiber having the following transmission characteristics: a cut-off wavelength of less than 1450 nm, a dispersion of 11.8 ps/nm/km at the 1560 nm wavelength, a dispersion slope of 0.069 ps/nm²/km, a mode field diameter of 9.7 μm, an effective area of 89 $\mu m^2$, a non-linearity coefficient of 0.98 $W^{-1}km^{-1}$, a macrobending coefficient of 0.1 dB/km, and a microbending coefficient of 3.8 (dB/km)/(g/mm).

Figure 12:
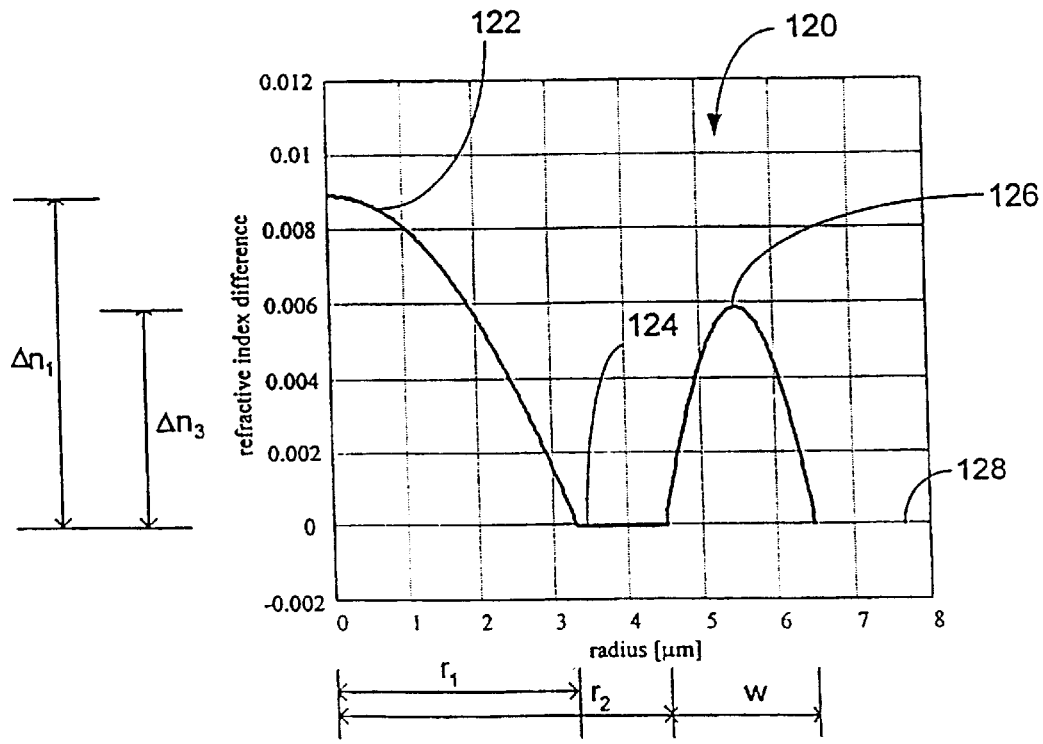
FIG. 12 is a graph illustrating the refractive-index profile of a further embodiment of a half-dispersion-shifted fiber having a positive dispersion.

As shown in FIG. 12, in a further, preferred, embodiment of a half-dispersion-shifted fiber, the refractive-index profile 100 may have a peak-and-ring shape. As shown in FIG. 6, fiber 68 includes an inner core 60, a first glass layer 62, a second glass layer 64, and a cladding 66. As shown in FIG. 12, the peak-and-ring profile 120 is characterized by a first peak 122 and a second peak 126, separated by an area of substantially constant refractive index 124. A cladding with substantially constant refractive index 128 surrounds second peak 126.

Inner core 60 has a radius $r_1$ (referring to FIG. 12) that is between about 2.2 and 4.0 $\mu m$, preferably between about 2.5 and 3.8 $\mu m$. In an example $r_1$ is about 3.4 $\mu m$. Between the center of the fiber and its outer radius, inner core 60 includes a refractive index-increasing dopant, such as $GeO_2$ or the like, that produces a peak index of refraction at or near the axial center of fiber 68 and a minimum for the inner core at its outer radius. At the peak, the refractive-index difference $\Delta n_1$ is between about 0.0070 and 0.0120, preferably between about 0.0075 and 0.0110. In an example $\Delta n_1$ is about 0.0088. The concentration of the refractive index-increasing dopant decreases from the center of core 60 to the outer radius in a manner to produce a profile having a curved slope that corresponds to graded index $\alpha$ profile. The curved slope has an $\alpha$ of about 2.

First glass layer 62 surrounds the inner core 60 and is characterized by an index of refraction across its width that is less than the indices of refraction along the radius of inner core 60. Preferably, first glass layer 62 is made of glass with a refractive-index difference of about 0. First glass layer 62 extends from the outer radius of inner core 60 to a radius $r_2$ of between about 3.0 and 6.0 $\mu m$, preferably between about 3.0 and 5.0 $\mu m$. In an example, $r_2$ is of about 4.6 $\mu m$.

The second glass layer 64 surrounds the first glass layer 62. Second glass layer 64 extends for a width w of between about 1.5 and 4.0 $\mu m$, preferably between about 1.6 and 3.8 $\mu m$. In an example w is of about 2.2 $\mu m$. As shown in FIG. 6, second glass layer 64 has a maximum index of refraction $\Delta n_3$ within its width. Second glass layer 64, like inner core 60, has its refractive-index difference increased by doping the width of the glass layer with $GeO_2$ or other well-known refractive index-increasing dopants. Second glass layer 64 has a refractive index profile substantially corresponding to an $\alpha$ profile, with a about 2. Preferably, second glass layer 64 has a maximum refractive-index difference $\Delta n_3$ of between about 0.0030 and 0.0080, preferably between about 0.0035 and 0.0060. In an example, $\Delta n_3$ is about 0.0053.

Finally, a light conducting cladding 66 surrounds the second glass layer 64 in a conventional manner to help guide light propagating along the axis of fiber 68. Cladding 66 preferably has a refractive-index difference substantially equal to 0, but may include dopants that do not raise its index of refraction above that of the maximum indices of refraction 122 and 126 of the inner core and the second layer.

Half-dispersion-shifted fiber 68 having refractive-index profile 120 of FIG. 12 has the following transmission characteristics: a cabled cut-off wavelength of less than 1500 nm, a dispersion of between about 8.0 ps/nm/km and 13.0 ps/nm/km at 1560 nm, an effective area of greater than 60 $\mu m^2$ at 1550 nm, a macrobending coefficient of less than 1 dB/km, and a microbending coefficient of less than 12 (dB/km)/(g/mm).

If the fiber profile parameters are within the given preferred range, half-dispersion-shifted fiber 68 having refractive-index profile 120 of FIG. 12 has the following preferred transmission characteristics: a cabled cut-off wavelength of less than 1500 nm, a dispersion of between about 9.0 ps/nm/km and 12.0 ps/nm/km at 1560 nm, an effective area of greater than 80 $\mu m^2$ at 1550 nm, a macrobending coefficient of less than 0.01 dB/km, and a microbending coefficient of less than 6 (dB/km)/(g/mm).

In the described example, half-dispersion-shifted fiber 68 has the following transmission characteristics: a cabled cut-off wavelength of less than 1450 nm, a dispersion of about 11.3 ps/nm/km at 1560 nm and 10.5 ps/nm/km at 1550 nm, a dispersion slope of about 0.082 ps/nm²/km at 1550 nm, a mode field diameter of 10.4 $\mu m$ at 1550 nm, an effective area of 85 $\mu m^2$ at 1550 nm, , a macrobending coefficient of 0.001 dB/km, and a microbending coefficient of 5 (dB/km)/(g/mm).

The performances of each of the exemplary embodiments of the half-dispersion-shifted fiber are similar and are suitable for use in accordance with the present invention. However, Applicants note that the peak-and-ring profile and the double-peak profile may be preferable to the other refractive-index profiles because they are easier to manufacture, and because, in addition to ensuring sufficient shift of dispersion, they generates a transversal field that is more similar to the one generated by existing transmission fiber, thus assuring compatibility with legacy fibers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical transmission line comprising:
    a first span including at least one single-mode fiber having a negative dispersion with an absolute value of between about 4 ps/nm/km and 7 ps/nm/km at 1560 nm; and
    a second span coupling to the first span, the second span having at least one single-mode fiber having a positive dispersion at 1560 nm, the positive dispersion of the second span compensating the negative dispersion of the first span such that the cumulative dispersion across the first and second spans is approximately zero, wherein the length of the first span is greater than the length of the second span.

2. The transmission line according to claim 1, wherein the fiber of the first span has a zero dispersion wavelength of between about 1600 nm and 1670 nm.

3. The transmission line according to claim 1, wherein the positive dispersion of the second span is between about 10 ps/nm/km and 20 ps/nm/km at 1560 nm.

4. The transmission line according to claim 1, wherein a ratio of the length of the first span to the length of the second span is less than about 7:1.

5. The transmission line according to claim 4, wherein a ratio of the length of the first span to the length of the second span is less than about 5:1.

6. The transmission line according to claim 1, wherein the fiber of the second span is a half-dispersion-shifted fiber having a zero dispersion wavelength between about 1350 nm and 1450 nm.

7. The transmission line according to claim 6, wherein the positive dispersion of the second span is between about 7.5 ps/nm/km and 15.5 ps/nm/km at 1560 nm.

8. The transmission line according to claim 7, wherein the positive dispersion of the second span is between about 8 ps/nm/km and 13 ps/nm/km at 1560 nm.

9. The transmission line according to claim 6, wherein a ratio of the length of the first span to the length of the second span is less than about 6:1.

10. The transmission line according to claim 9, wherein a ratio of the length of the first span to the length of the second span is less than about 4:1.

11. The transmission line according to claim 6, wherein the half-dispersion-shifted fiber has an attenuation equal to or less than about 0.195 dB/km at 1560 nm.

12. A high-speed optical communications system comprising:
- a transmission line having first and second spans, each of the first and second spans having at least one single-mode fiber, the fiber of the first span having a negative dispersion with an absolute value of between about 4 ps/nm/km and 7 ps/nm/km at 1560 nm and the fiber of the second span having a positive dispersion at 1560 nm, the positive dispersion of the second span compensating the negative dispersion of the first approximately zero, wherein the length of the first span is greater than the length of the second span;
- a transmitting device for adding a signal to the transmission line, the transmitting device being coupled to one end of the transmission line; and
- a receiving device for receiving the signal sent by the transmitting device, the receiving device being coupled to another end of the transmission line.

13. A method of transmitting a signal over a transmission line having first and second spans of single mode optical fiber, the method comprising the steps of:
- adding the signal to the transmission line;
- transmitting the signal over the first span of optical fiber having a negative dispersion with an absolute value of between about 4 ps/nm/km and 7 ps/nm/km at 1560 nm;
- compensating for the negative dispersion of the first span by guiding the signal over the second span of optical fiber having a positive dispersion at 1560 nm, the total dispersion over the transmission line being compensated to approximately zero, wherein the length of the first span is greater than the length of the second span; and
- dropping the signal from the transmission line.

14. The method of claim 13, wherein the signal is added to the transmission line with a transmitting device.

15. The method of claim 13, wherein the signal is dropped from the transmission line with a receiving device.

16. An optical transmission line, comprising:
- a first span including at least one single-mode fiber having a negative dispersion with an absolute value of between about 2.5 ps/nm/km and 10 ps/nm/km at 1560 nm; and
- a second span coupling to the first span, the second span having at least one single-mode fiber having a positive dispersion at 1560 nm, the positive dispersion of the second span compensating the negative dispersion of the first span such that the cumulative dispersion across the first and second spans is approximately zero, wherein the length of the first span is greater than the length of the second span, wherein the fiber of the second span is a half-dispersion-shifted fiber having a zero dispersion wavelength between about 1350 nm and 1450 nm.

17. The transmission line according to claim 16, wherein the positive dispersion of the second span is between about 7.5 ps/nm/km and 15.5 ps/nm/km at 1560 nm.

18. The transmission line according to claim 17, wherein the positive dispersion of the second span is between about 8 ps/nm/km and 13 ps/nm/km at 1560 nm.

19. The transmission line according to claim 16, wherein a ratio of the length of the first span to the length of the second span is less than about 6:1.

20. The transmission line according to claim 19, wherein a ratio of the length of the first span to the length of the second span is less than about 4:1.

21. The transmission line according to claim 16, wherein the half-dispersion-shifted fiber has an attenuation equal to or less than about 0.195 dB/km at 1560 nm.

22. A single mode optical transmission fiber for housing within an optical fiber cable, the fiber having a core and a cladding, the core comprising:
- an inner core having a first refractive-index difference; and
- a first glass layer surrounding the inner core and having a second refractive-index difference, wherein the fiber has a peak refractive index difference of less than or equal to about 0.0140, a zero-dispersion wavelength of less than about 1450 nm, a dispersion value of between about 7.5 and 15.5 ps/nm/km at an operating wavelength of about 1560 nm and an effective area of at least 60 $\mu m^2$, and wherein the fiber has a cabled cutoff wavelength of less than about 1500 nm.

23. The fiber of claim 22, wherein the first refractive-index difference is about zero and the second refractive-index difference is greater than zero.

24. The fiber of claim 23, wherein the second refractive-index difference is about 0.0120.

25. The fiber of claim 22, further comprising a second glass layer surrounding the first glass layer and having a third refractive-index difference.

26. The fiber of claim 25, wherein the second refractive-index difference is greater than the first refractive-index difference and the third refractive-index difference, and each of the first, second, and third refractive-index differences are greater than zero.

27. The fiber of claim 26, wherein the first refractive-index difference is about 0.0025, the second refractive-index difference is about 0.0070, and the third refractive-index difference is about 0.0017.

28. The fiber of claim 25, wherein the first refractive-index difference is greater than zero, the second refractive-index difference is about zero, and the third refractive-index difference is greater than zero.

29. The fiber of claim 28, wherein the first refractive-index difference is about 0.0100 and the third refractive-index difference is about 0.0120.

30. The fiber of claim 29, wherein the first refractive-index difference is between about 0.0070 and 0.0120.

31. A high negative dispersion single-mode optical transmission fiber having a core and a cladding, the core comprising:
- an inner core having a first refractive index difference between about 0.0100 and 0.0160;
- a first glass layer surrounding the inner core and having a substantially constant refractive index difference, the first refractive index difference of the inner core being greater than the second refractive index difference of the first glass layer;
- a second glass layer surrounding the first glass layer and having a third refractive index difference between about 0.0030 and 0.0080;
- and wherein the cabled fiber has a cutoff wavelength less than about 1500 nm and a value of dispersion between about −8.0 ps/nm/km and −3.0 ps/nm/km at a wavelength of about 1560 nm.

32. The fiber of claim 31, wherein the inner core extends to an outer radius of between about 1.9 and 3.0 μm, and the first glass layer extends from the outer radius of the inner core to an outer radius of between about 3.5 and 8.0 μm and the second glass layer has a width of between about 1.5 and 4.0 μm.

33. The fiber of claim 30, wherein the first refractive-index difference is between about 0.0075 and 0.0110.

34. The fiber of claim 28, wherein the inner core has a graded α profile.

35. The fiber of claim 34, wherein α is about 2.

36. The fiber of claim 30, wherein the third refractive-index difference is between about 0.0030 and 0.0080.

37. The fiber of claim 36, wherein the third refractive-index difference is between about 0.0035 and 0.0060.

38. The fiber of claim 22, wherein the effective area is greater than or equal to 70 μm² at 1550 nm.

39. The fiber of claim 38, wherein the effective area is greater than or equal to 80 μm² at 1550 nm.

40. The fiber of claim 22, wherein the dispersion value at about 1560 nm is between about 8 and 13 ps/nm/km.

41. The fiber of claim 40, wherein the dispersion value at about 1560 nm is between about 9 and 12 ps/nm/km.

42. The fiber of claim 22, wherein the attenuation at a wavelength of 1560 nm is lower than or equal to 0.210 dB/km.

43. The fiber of claim 42, wherein the attenuation at a wavelength of 1560 nm is lower than or equal to 0.205 dB/km.

44. The fiber of claim 42, wherein the attenuation at a wavelength of 1560 nm is lower than or equal to 0.195 dB/km.

45. The fiber of claim 22, wherein the macrobending coefficient is lower than or equal to 1 dB/km.

46. The fiber of claim 22, wherein the macrobending coefficient is lower than or equal to 12 (dB/km)/(g/mm).

47. The fiber of claim 46, wherein the microbending coefficient is lower than or equal to 6.1 (dB/km)/(g/mm).

48. The fiber of claim 22, wherein the zero-dispersion wavelength is greater than 1350 nm.

49. A cable comprising at least one single mode optical transmission fiber according to claim 22.

50. The fiber of claim 31, wherein the dispersion value at a wavelength of about 1560 nm is between about −7 and −4 ps/nm/km.

51. The fiber of claim 31, wherein the fiber has an effective area greater than 50 μm².

52. The fiber of claim 31, wherein the fiber has an effective area of at least 60 μm².

53. The fiber of claim 31, wherein the fiber has an attenuation lower than or equal to 0.210 dB/km at a wavelength of about 1560 nm.

54. The fiber of claim 31, wherein the fiber has a zero-dispersion-wavelength between 1600 and 1670 nm.

55. The fiber of claim 31, wherein the fiber has a macrobending coefficient of less than 10 dB/km.

56. The fiber of claim 31, wherein the fiber has a microbending coefficient of less than 12 (dB/km)/(g/mm).

57. The fiber of claim 31, wherein the first refractive-index difference is between about 0.0120 and 0.0140.

58. The fiber of claim 31, wherein the first glass layer has a refractive-index difference of about 0.

59. The fiber of claim 31, wherein the third refractive-index difference is between about 0.0035 and 0.0060.

60. The fiber of claim 32, wherein the inner core has a radius of between about 2.2 and 2.7 μm.

61. The fiber of claim 32, wherein the first glass layer extends from the outer radius of the inner core to an outer radius of between about 4.0 and 5.5 μm.

62. The fiber of claim 32, wherein the second glass layer has a width of between about 1.6 and 3,4 μm.

* * * * *

UNITED STATES PATENT AND TRADEMARK OFFICE
CERTIFICATE OF CORRECTION

PATENT NO. : 6,633,713 B2
DATED : October 14, 2003
INVENTOR(S) : Bartolomeo Italo Tirloni et al.

It is certified that error appears in the above-identified patent and that said Letters Patent is hereby corrected as shown below:

Column 19,
Lines 18-19, "first approximately" should read -- first span such that the cumulative dispersion across the first and second spans is approximately --.

Column 20,
Line 48, "claim 29," should read -- claim 28, --.

Column 22,
Line 11, "claim 31," should read -- claim 51, --.
Line 34, "and 3,4" should read -- and 3.4 --.

Signed and Sealed this

Twenty-eighth Day of September, 2004

JON W. DUDAS
*Director of the United States Patent and Trademark Office*